(12) United States Patent
Grbovic

(10) Patent No.: US 8,432,055 B2
(45) Date of Patent: Apr. 30, 2013

(54) WIND TURBINE HAVING A HIGH-VOLTAGE RIDE THROUGH (HVRT) MODE

(75) Inventor: Petar Jovan Grbovic, Ismaning (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/323,309

(22) Filed: Dec. 12, 2011

(65) Prior Publication Data
US 2012/0133343 A1    May 31, 2012

(51) Int. Cl.
*F03D 9/00* (2006.01)
*H02P 11/00* (2006.01)

(52) U.S. Cl.
USPC .............................................. 290/44; 322/20

(58) Field of Classification Search .......... 290/44, 290/55; 700/286, 287; 322/20; 307/112, 307/43
See application file for complete search history.

(56) References Cited

U.S. PATENT DOCUMENTS

| | | | |
|---|---|---|---|
| 7,126,236 B2 * | 10/2006 | Harbourt et al. | 290/44 |
| 7,394,166 B2 * | 7/2008 | Teichmann et al. | 290/44 |
| 7,786,608 B2 * | 8/2010 | Menke | 290/44 |
| 7,978,445 B2 * | 7/2011 | Ritter | 361/18 |
| 8,013,461 B2 * | 9/2011 | Delmerico et al. | 290/44 |
| 8,093,741 B2 * | 1/2012 | Ritter et al. | 290/44 |
| 8,207,623 B2 * | 6/2012 | Rivas et al. | 290/44 |
| 2002/0099476 A1 * | 7/2002 | Hamrin et al. | 700/287 |
| 2007/0177314 A1 * | 8/2007 | Weng et al. | 361/20 |
| 2008/0150285 A1 * | 6/2008 | Corcelles Pereira et al. | 290/44 |
| 2011/0057444 A1 * | 3/2011 | Dai et al. | 290/44 |
| 2011/0089693 A1 * | 4/2011 | Nasiri | 290/44 |

OTHER PUBLICATIONS

C. Wessels, F.W. Fuchs, "High Voltage Ride Through with FACTS for DFIG Based Wind Turbines", Wessels Christian, 2009, pp. 1-10, Institute of Power Electronics and Electrical Drives, Christian-Albrechts- University of Kiel, Kiel, Germany.
C. Feltes, S. Engelhardt, J. Kretschmann, J. Fortmann, F. Koch, I. Elrich, "High Voltage Ride-Through of DFIG-based Wind Turbines", IEEE, 2008, pp. 1-8, Germany.

* cited by examiner

*Primary Examiner* — Julio Cesar Gonzalez
(74) *Attorney, Agent, or Firm* — Cantor Colburn LLP

(57) ABSTRACT

A wind turbine connected to a power grid is provided. The wind turbine is selectively activated to operate at a high-voltage ride through (HVRT) mode. The wind turbine includes a grid voltage circuit, a DC bus, a voltage source, and a dynamic brake. The grid voltage circuit monitors a fundamental voltage of the power grid and activates the HVRT mode if the fundamental voltage is at least about equal to a threshold voltage value. The DC bus has a DC bus voltage. The voltage source provides a DC bus rated voltage. The dynamic brake has a brake chopper and a resistive element. The dynamic brake is connected to the DC bus. The dynamic brake is connected to the voltage source if the HVRT mode is activated.

16 Claims, 4 Drawing Sheets

WIND TURBINE HAVING A HIGH-VOLTAGE RIDE THROUGH (HVRT) MODE

BACKGROUND OF THE INVENTION

The subject matter disclosed herein relates to a wind turbine, and more specifically to a wind turbine having a high-voltage ride through (HVRT) mode.

Generally, a wind turbine includes a turbine that has a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

In order to supply power to a power grid, the wind turbine needs to conform to certain requirements. For example, the wind turbine may need to offer high-voltage ride through (HVRT) capability. HVRT capability requires the wind turbine to stay connected to the power grid during an over-voltage condition. In one example, the wind turbine needs to stay connected to the power grid in the event the power grid is at 130% of the rated voltage for about 60 milliseconds. In another example, the HVRT capability requires the wind turbine to stay connected to the power grid in the event the power grid is at 180% of the rated voltage for about 40 milliseconds.

The wind turbine includes a power converter that is used to convert a frequency of generated electric power to a frequency substantially similar to a power grid frequency. However, an over-voltage condition in the power grid may cause issues with the operation of the power converter. Specifically, for example, if the voltage to a DC link capacitor is above a breakdown voltage of the DC link capacitor, this may damage the DC link capacitor. Thus, a relatively large and bulky DC bus capacitor having a relatively high breakdown voltage may be provided. In another example, if the power convertor employs semiconductor switches such as insulated gate bipolar transistors (IGBTs) or integrated gate commutated thyristors (IGCTs), an over-current condition may exert stress or render the switches in the power converter inoperable. Thus, a line inductor that connects the power converter to the power grid may be provided having a relatively high voltage rating to protect the switches located in the power converter. However, providing large, bulky capacitors and inductors adds cost and complexity to the wind turbine.

BRIEF DESCRIPTION OF THE INVENTION

According to one aspect of the invention, a wind turbine connected to a power grid is provided. The wind turbine is selectively activated to operate at a high-voltage ride through (HVRT) mode. The wind turbine includes a grid voltage circuit, a DC bus, a voltage source, and a dynamic brake. The grid voltage circuit monitors a fundamental voltage of the power grid and activates HVRT mode if the fundamental voltage is at least about equal to a threshold voltage value. The DC bus has a DC bus voltage. The voltage source provides a DC bus rated voltage. The dynamic brake has a brake chopper and a resistive element. The dynamic brake is connected to the DC bus. The dynamic brake is connected to the voltage source if HVRT mode is activated. The brake chopper regulates the DC bus voltage by connecting the resistive element to the DC bus if the DC bus voltage is at least about equal the DC bus rated voltage.

According to another aspect of the invention, a method of controlling a wind turbine is provided. The wind turbine is selectively activated to operate at a high-voltage ride through (HVRT) mode. The method includes monitoring a fundamental voltage of a power grid with a grid voltage circuit. The method includes generating a mode signal in the event the fundamental voltage is at least about equal to a threshold voltage value. The method includes providing a DC bus having a DC bus voltage, a voltage source providing a DC bus rated voltage, and a dynamic brake having a brake chopper and a resistive element. The method includes connecting the dynamic brake to the DC bus. The method includes connecting the dynamic brake to the voltage source if HVRT mode is activated. The method includes regulating the DC bus voltage with the brake chopper connecting the resistive element to the DC bus if the DC bus voltage is at least about equal the DC bus rated voltage.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As used herein, the term "blade" is intended to be representative of any device that provides a reactive force when in motion relative to a surrounding fluid. As used herein, the term "wind turbine" is intended to be representative of any device that generates rotational energy from wind energy, and more specifically, converts kinetic energy of wind into mechanical energy. The term "control module" refers to an application specific integrated circuit (ASIC), an electronic circuit, a processor (shared, dedicated, or group) and memory that executes one or more software or firmware programs, a combinational logic circuit, and/or other suitable components that provide the described functionality. As used herein, the term "brake chopper" is intended to be representative of any device that includes a switch that connects a DC bus voltage to a resistive element, where the resistive element converts electrical energy to heat.

Figure 1:
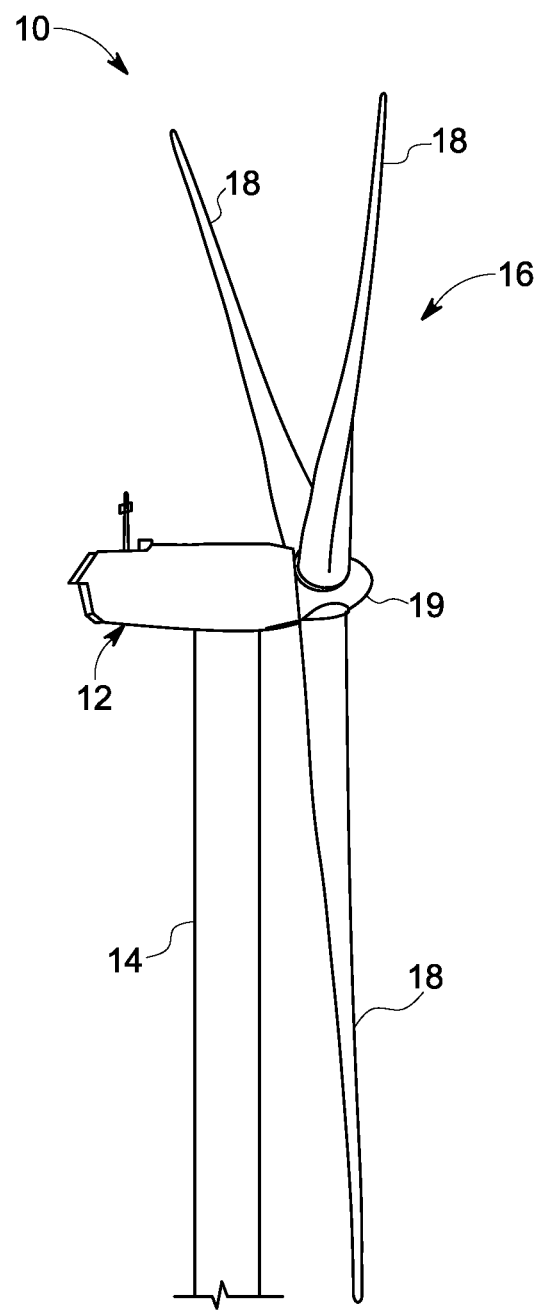
FIG. 1 is a perspective view of a portion of an exemplary wind turbine.

FIG. 1 is a perspective view of a portion of an exemplary wind turbine 10. Wind turbine 10 includes a nacelle 12 housing a generator (not shown in FIG. 1). Nacelle 12 is mounted on a tower 14 (a portion of tower 14 being shown in FIG. 1). Tower 14 may have any suitable height that facilitates operation of wind turbine 10 as described herein. Wind turbine 10 also includes a rotor 16 that includes three blades 18 attached to a rotating hub 19. Alternatively, wind turbine 10 includes any number of blades 18 that facilitates operation of wind turbine 10 as described herein. In the exemplary embodiment, wind turbine 10 includes a gearbox (not shown in FIG. 1) operatively coupled to rotor 16 and a generator (not shown in FIG. 1).

Figure 2:
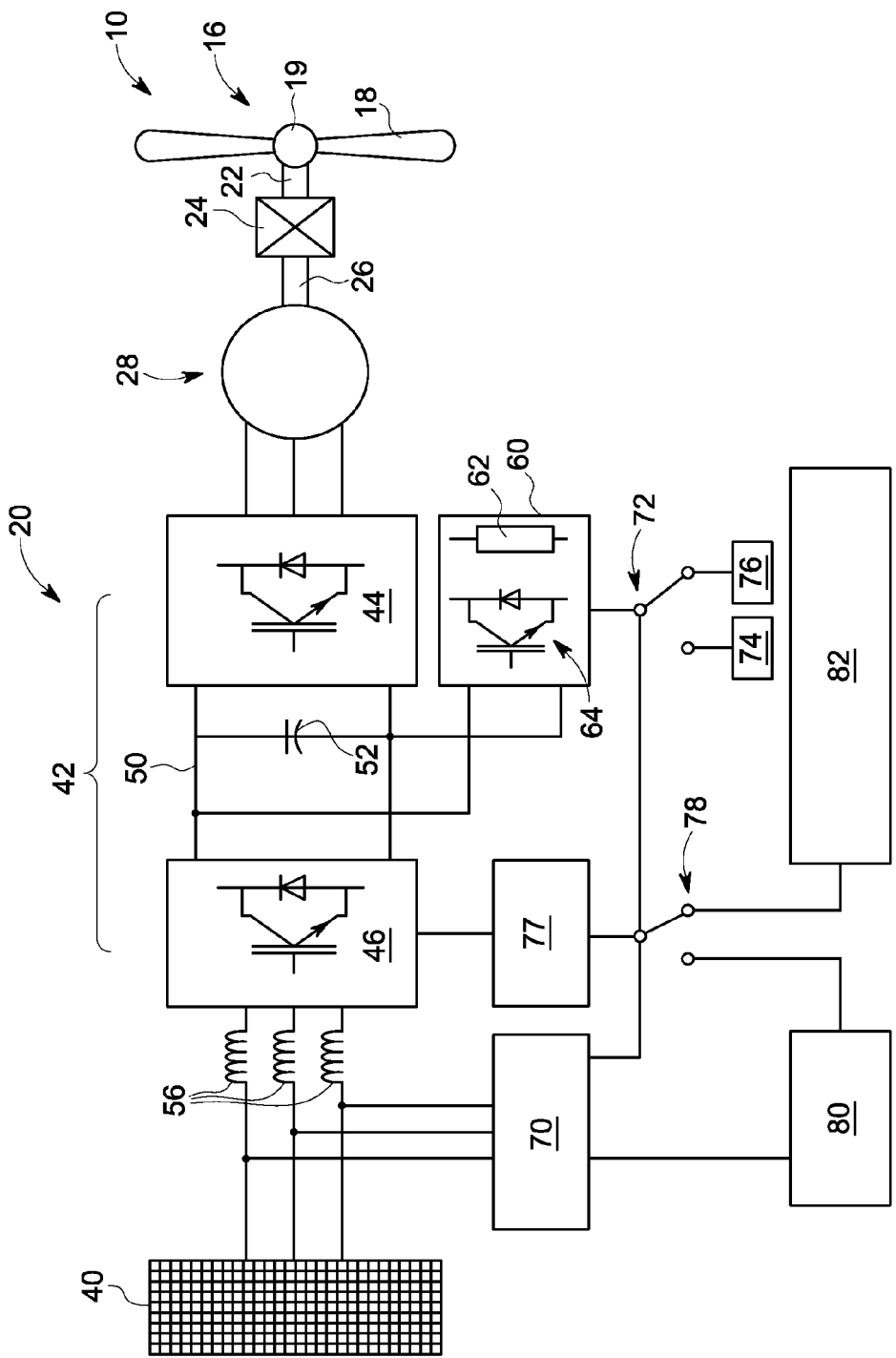
FIG. 2 is a schematic view of an exemplary electrical and control system for use with the wind turbine illustrated in FIG. 1.

FIG. 2 is a schematic view of an exemplary electrical and control system 20 that may be used with wind turbine 10. Rotor 16 includes blades 18 coupled to hub 19. Rotor 16 also includes a low-speed shaft 22 rotatably coupled to hub 19. Low-speed shaft 22 is coupled to a step-up gearbox 24 that is configured to step up the rotational speed of low-speed shaft 22 and transfer that speed to a high-speed shaft 26. In the exemplary embodiment, gearbox 24 has a step-up ratio of approximately 70:1. For example, low-speed shaft 22 rotating at approximately 20 revolutions per minute (rpm) coupled to gearbox 24 with an approximately 70:1 step-up ratio generates a speed for high-speed shaft 26 of approximately 1400 rpm. Alternatively, gearbox 24 has any suitable step-up ratio that facilitates operation of wind turbine 10 as described herein. As a further alternative, wind turbine 10 includes a direct-drive generator that is rotatably coupled to rotor 16 without any intervening gearbox.

High-speed shaft 26 is rotatably coupled to generator 28. In one exemplary embodiment, generator 28 is a permanent magnet generator that includes a plurality of permanent magnets (not shown). In yet another embodiment, generator 28 is a Tesla induction type generator.

Wind turbine 10 is connected to a power grid 40, where wind turbine 10 supplies AC power to power grid 40. A main power converter 42 generally includes circuitry for converting a variable frequency AC voltage from generator 28 into a voltage that is supplied to power grid 40. Specifically, main power converter 42 is selectively activated to produce an output voltage, which is the AC voltage supplied to power grid 40. Main power converter 42 may include various power switching devices such as, for example, insulated gate bipolar transistors (IGBTs) or integrated gate-commutated thyristors (IGCTs). Main power converter 42 includes a generator side converter 44 and a line or grid side converter 46. Generator side converter 44 receives an AC input voltage from generator 28 and provides for conversion of the AC input voltage into a DC voltage. Generator side converter 44 provides the DC voltage to grid side converter 46 through a DC bus 50 that includes a DC link capacitor 52. Grid side converter 46 converts the DC voltage to an AC output voltage that is fed to power grid 40. Transmission line inductors 56 are located between grid side converter 46 and power grid 40.

A dynamic brake 60 is included for substantially preventing DC bus 50 from reaching an over-voltage condition, which in turn will protect generator side converter 44 and grid side converter 46. Dynamic brake 60 includes a resistance element 62 as well as a brake chopper 64. Brake chopper 64 selectively regulates the DC bus voltage by connecting resistive element 62 to DC bus 50.

A grid voltage circuit 70 is provided and includes circuitry (not shown) for monitoring power grid 40 and detecting a fundamental voltage of power grid 40. In the event the fundamental voltage is about equal to a threshold voltage value, this indicates an over-voltage condition. Wind turbine 10 switches to high-voltage ride through (HVRT) mode in the event an over-voltage condition is detected. For example, in one embodiment, the threshold value may range from about 130% to about 180% of a nominal voltage of power grid 40. Grid voltage detection circuit 70 further includes circuitry or a microprocessor (not shown) having control logic for sending a mode signal in the event the fundamental voltage is at least about equal to a threshold voltage value. The mode signal sent by grid voltage circuit 70 is an indicator that switches wind turbine 10 into HVRT mode. HVRT mode requires wind turbine 10 to stay connected to power grid 40 during an over-voltage condition.

A voltage switching element 72 is in communication with grid voltage circuit 70. Voltage switching element 72 selectively connects to either a DC bus rated voltage source 74 or a normal operation voltage source 76. Voltage switching element 72 is normally connected to normal operation voltage source 76. In the event voltage switching element 72 receives the mode signal from grid voltage circuit 70, voltage switching element 72 disconnects from normal operation voltage source 76 and connects to DC bus rated voltage source 74. In the exemplary embodiment as shown, voltage switching element 72 is a single-pole double throw switch, however it is to be understood that other switching elements such as, for example, a transistor, may be used as well.

Normal operation voltage source 76 provides a voltage to DC bus 50 in the event wind turbine 10 is not operating in HVRT mode. Specifically, the voltage supplied to DC bus 50 when wind turbine 10 is not in HVRT mode is a nominal range voltage $V_{BUSMAX1}$. Specifically, the value of nominal voltage range $V_{BUSMAX1}$ may be an upper limit of the specified range of the nominal voltage of DC bus 50, which is typically about 5% above the nominal range of DC bus 50, however it is to be understood that other ranges may be used as well. DC bus rated voltage source 74 provides a DC bus rated voltage $V_{BUSMAX2}$. DC bus rated voltage is the greatest amount of voltage that DC bus 50 is configured or rated to withstand for a specified period of time, while substantially ensuring operation of DC bus 50. In one embodiment, the specified period of time may range from about 40 milliseconds to about 60 milliseconds, however it is to be understood that other ranges may be used as well.

In one illustrative embodiment, if the nominal voltage of DC bus 50 is 2250 Volts, then the nominal voltage range $V_{BUSMAX1}$ voltage may be between about 2300 to about 2350 Volts, and the DC bus rated voltage $V_{BUSMAX2}$ may be about 2600 Volts. Voltage switching element 72 selectively connects DC bus 50 with DC bus rated voltage source 74 in the event the mode signal is sent to the switching element. That is, in the event an over-voltage condition is detected in power grid 40, voltage switching element 72 disconnects from normal operation voltage source 76 to DC bus rated voltage source 74. When the voltage supplied to DC bus 50 is the DC bus rated voltage $V_{BUSMAX2}$, wind turbine 10 operates in HVRT mode.

Voltage switching element 72 is connected to dynamic brake 60. Dynamic brake 60 is connected to DC bus 50 in parallel to control the DC bus voltage. Voltage switching element 72 selectively connects dynamic brake 60 to either DC bus rated voltage source 74 or normal operation voltage source 76, depending on whether HVRT mode is activated or not. Brake chopper 64 of dynamic brake 60 selectively regulates DC bus voltage of DC bus 50 by connecting resistive element 62 to DC bus 50 in the event that voltage switching element 72 is connected to DC bus rated voltage source 74. That is, the voltage supplied to DC bus 50 increases until the DC bus voltage reaches the DC bus rated voltage $V_{BUSMAX2}$. Once the DC bus voltage reaches or is at least about equal to the DC bus rated voltage $V_{BUSMAX2}$, brake chopper 64 regulates the DC bus voltage by connecting resistive element 62 to DC bus 50. When resistive element 62 is connected to DC bus 50, excess power generated by DC bus rated voltage source 74 is dissipated as heat through resistive element 62. Thus, a line current flowing through DC bus 50 may be controlled more easily than if the voltage supplied to DC bus 50 was $V_{BUSMAX1}$.

A mode switching element 78 is provided and in communication with grid voltage circuit 70 and a gate driver module 77. Gate driver module 77 is provided for controlling the power switching devices (i.e. IGBTs or IGCTs) of grid side converter 46. Specifically, gate driver module 77 may include circuitry (not shown) and a microprocessor (not shown) for controlling the power switching devices (not shown) of grid side converter 46.

Mode switching element 78 selectively connects to either a six-step modulator 80 or a converter control module 82 providing pulse-width modulation (PWM) control. In the exemplary embodiment as shown, mode switching element 78 is a single-pole double throw switch, however it is to be understood that other switching elements such as, for example, a transistor, may be used as well. Mode switching element 78 is normally connected to converter control module 82 that provides PWM control to grid side converter 46. In the event mode switching element 78 receives the mode signal from grid voltage circuit 70, mode switching element 78 disconnects from the converter control module 82 and connects to six-step modulator 80. That is, if wind turbine 10 is switched into HVRT mode, mode switching element 78 connects to six-step modulator 80.

Six-step modulator 80 provides a switching frequency to grid side converter 46, where the switching frequency is about the same as a fundamental frequency of power grid 40. Thus, because the switching frequency is about the same as the fundamental frequency, there are no significant switching losses on grid side converter 46. Therefore, the voltage through DC bus 50, which is controlled by dynamic brake 60 in HVRT mode, may be between about 10% to about 20% higher than the nominal voltage of DC bus 50. Because six-step modulation and a higher transient DC bus voltage are employed when wind turbine 10 is in HVRT mode, the line current line current flowing through the DC bus 50 may be controlled more easily than if HVRT mode was not activated.

In the event that HVRT mode is not activated, the maximum RMS voltage of power converter 42, which is denoted as $V_{OUT}$, is:

$$V_{OUT} = \frac{\sqrt{3}}{\sqrt{2}} \frac{V_{BUSMAX1}}{2} 1.15$$

The line current across DC bus 50, which is denoted as $I_{LINE}$, is:

$$I_{LINE} = \frac{V_{GRID} - \frac{\sqrt{3}}{\sqrt{2}} \frac{V_{BUSMAX1}}{2} 1.15}{\omega L}$$

where L represents the total inductance of power grid 40 including line inductors 56 and an interconnection transformer located between power grid and wind turbine 10 (not shown), and ω represents the frequency of power grid 40 In the event that HVRT mode is activated, the maximum RMS voltage of power converter 42, which is denoted as $V_{OUTmax}$, is:

$$V_{OUTmax} = \frac{\sqrt{3}}{\sqrt{2}} \frac{V_{BUSMAX2}}{2} \frac{4}{\pi}$$

The line current across DC bus 50, which is denoted as $I_{LINE(CONTROLLED)}$, is:

$$I_{LINE(CONTROLLED)} = \frac{V_{GRID} - \frac{\sqrt{3}}{\sqrt{2}} \frac{V_{BUSMAX2}}{2} \frac{4}{\pi}}{\omega L}$$

where L represents the total inductance of power grid 40 including line inductors 56 and an interconnection transformer located between power grid and wind turbine 10 (not shown), and ω represents the frequency of power grid 40.

Figure 3:
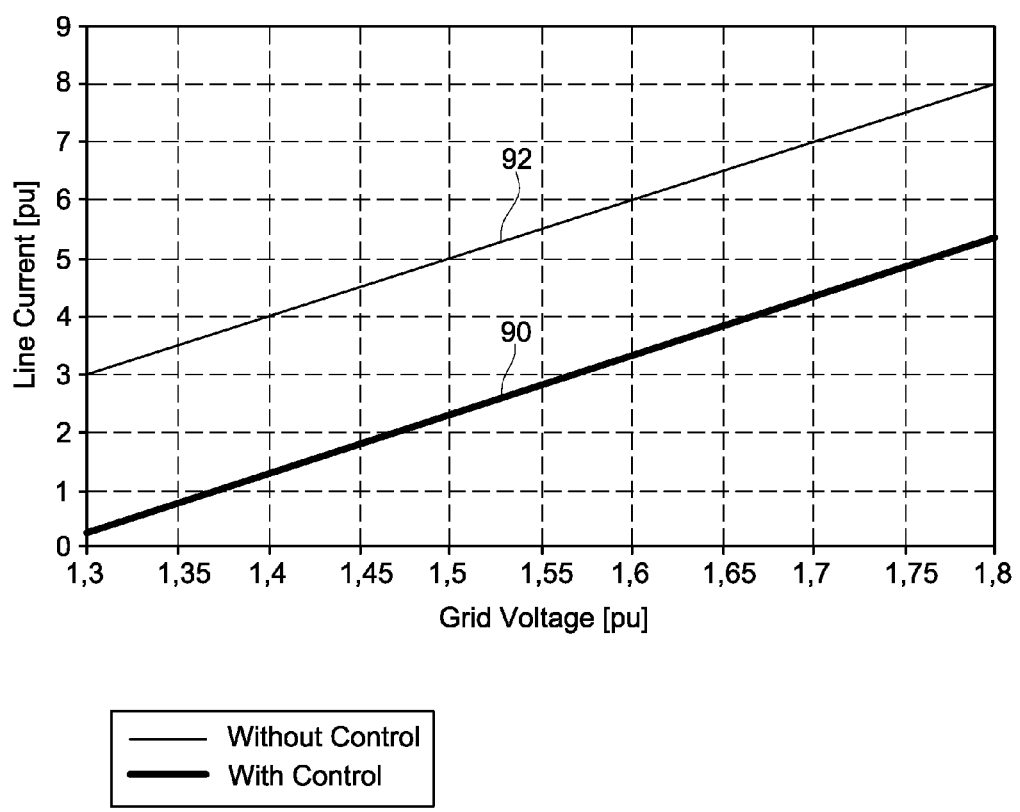
FIG. 3 is an exemplary illustration of a graph illustrating operating parameters of the wind turbine shown in FIG. 1.

In one illustrative example as shown in FIG. 3, the difference in line current of DC bus 50 with and without HVRT mode activated is illustrated as a graph plotting line current of DC bus 50 versus grid voltage. Specifically, reference number 90 indicates the line current versus grid voltage with HVRT mode activated and reference number 92 indicates the line current versus grid voltage without HVRT mode activated. As seen in FIG. 3, the difference in the line current is about 2.5 pu (per unit). That is, at a grid voltage of about 1.5 pu, the line current with HVRT mode activated is about 3 pu, and the line current without the HVRT mode activated is about 5.5 pu. In one embodiment, the grid voltage circuit 70 (shown in FIG. 2) detects the line current, and the line current is the criterion to deactivate HVRT mode. Also, in another embodiment, the grid voltage measured before an interconnection transformer (not shown in FIG. 2) and the transmission line inductors 56 may be used as detection criterion to deactivate HVRT mode as well.

Figure 4:
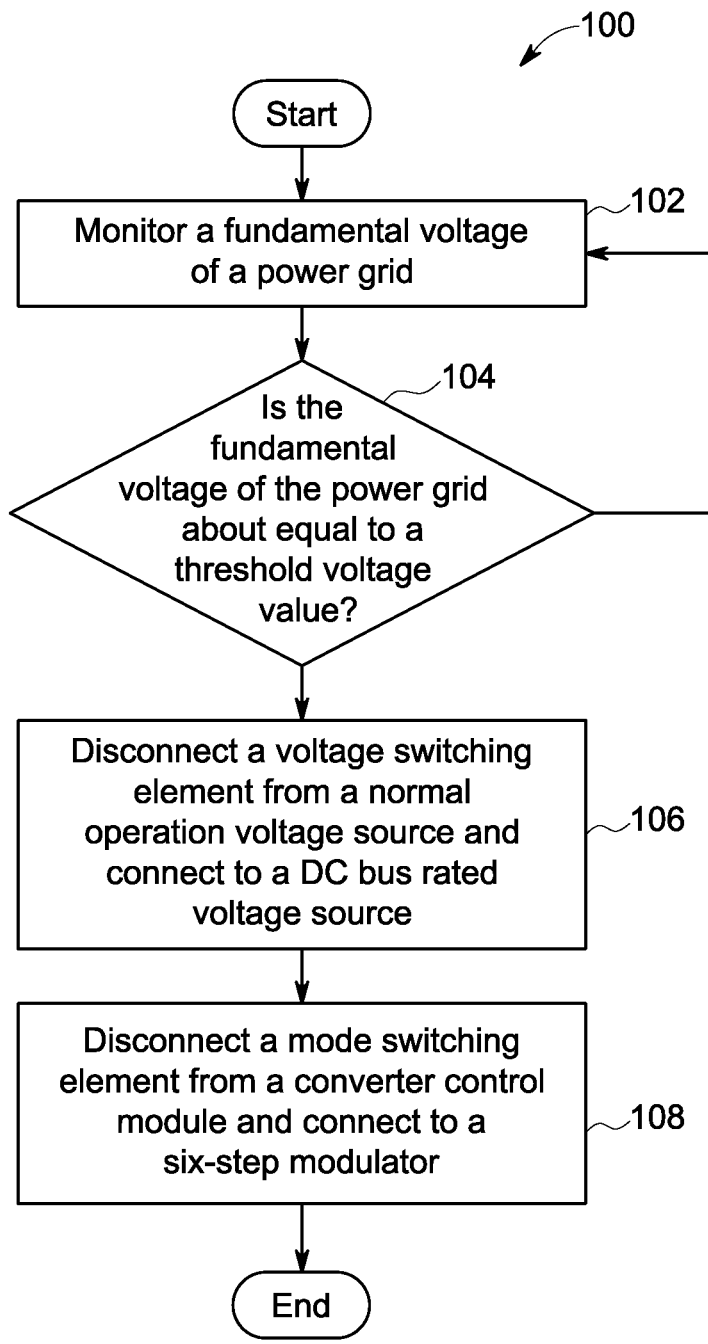
FIG. 4 is an exemplary process flow diagram illustrating a method of operating the wind turbine as shown in FIG. 1.

FIG. 4 is a process flow diagram of an exemplary method of operating wind turbine 10. An exemplary process of operating wind turbine 10 (shown in FIG. 2) is generally indicated by reference number 100. Process 100 begins at 102, where grid voltage circuit 70 monitors power grid 40 for the fundamental voltage of power grid 40. Process 100 may then proceed to 104. In 104, in the event the fundamental voltage of power grid 40 is about equal to the threshold voltage value, grid voltage detection circuit 70 sends a mode signal. The mode signal sent by grid voltage circuit 70 is an indicator that switches wind turbine 10 into HVRT mode. HVRT mode requires wind turbine 10 to stay connected to power grid 40 during an over-voltage condition. Process 100 may then proceed to 106 if the mode signal is sent by the grid voltage detection circuit. In 106, voltage switching element 72 disconnects from normal operation voltage source 76 and connects to DC bus rated voltage source 74. Process 100 may then proceed to 108. In 108, mode switching element 78 disconnects from the converter control module 78 and connects to six-step modulator 80. Process 100 may then terminate.

The above described system and method of operating wind turbine 10 employs six-step modulation and a higher transient DC bus voltage when wind turbine 10 is in HVRT mode. Thus, the line current line current flowing through DC bus 50 may be controlled more easily than if HVRT mode was not activated. As a result, power switching devices (i.e. IGBTs and IGCTs) of main power converter 42 may experience a reduction in current stress during operation of wind turbine 10. Therefore, power converter 42 may include switches with reduced size and cost when compared to some power converters that are currently employed in some wind turbines. Also, line inductors 56 may be smaller and less expensive when compared to some line inductors that are currently used as well.

Exemplary embodiments of a wind turbine, a control system for a wind turbine, and methods of controlling a wind turbine are described above in detail. The methods, wind turbine, and control system are not limited to the specific embodiments described herein, but rather, components of the wind turbine and/or the control system and/or steps of the methods may be utilized independently and separately from other components and/or steps described herein. For example, the control system and methods may also be used in combination with other wind turbine power systems and methods, and are not limited to practice with only the power system as described herein. Rather, the exemplary embodiment can be implemented and utilized in connection with many other wind turbine or power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A wind turbine connected to a power grid, the wind turbine selectively activated to operate at a high-voltage ride through (HVRT) mode, the wind turbine comprising:
   a grid voltage circuit for monitoring a fundamental voltage of the power grid and activating the HVRT mode if the fundamental voltage is at least about equal to a threshold voltage value;
   a DC bus having a DC bus voltage;
   a voltage source providing a DC bus rated voltage;
   a dynamic brake having a brake chopper and a resistive element, the dynamic brake connected to the DC bus, and the dynamic brake connected to the voltage source if the HVRT mode is activated, the brake chopper regulating the DC bus voltage by connecting the resistive element to the DC bus if the DC bus voltage is at least about equal to the DC bus rated voltage;
   a grid side converter and a generator side converter, the DC bus coupling the grid side converter with the generator side converter; and
   a mode switching element in communication with the grid voltage circuit and selectively connected to a six-step modulator, the mode switching element connecting the grid side converter to the six-step modulator if the HVRT mode is activated.

2. The wind turbine as recited in claim 1, wherein the grid voltage circuit generates a mode signal if the HVRT mode is activated.

3. The wind turbine as recited in claim 1, comprising a voltage switching element that is in communication with the grid voltage circuit and selectively connected to the voltage source, wherein the voltage switching element supplies the dynamic brake with the DC bus rated voltage if the HVRT mode is activated.

4. The wind turbine as recited in claim 3, comprising a normal operation voltage source that is configured for providing a nominal range voltage to the DC bus if the HVRT mode is not activated, wherein the voltage switching element switches from the normal operation voltage source to the voltage source if the HVRT mode is activated.

5. The wind turbine as recited in claim 1, wherein the DC bus rated voltage is the greatest amount of voltage that the DC bus is configured to withstand for a specified period of time while substantially ensuring operation of the DC bus.

6. The wind turbine as recited in claim 5, wherein the specified period of time ranges from about 40 milliseconds to about 60 milliseconds.

7. The wind turbine as recited in claim 1, comprising a gate driver module connected to the grid side converter for controlling a plurality of power switching devices of the grid side converter.

8. The wind turbine as recited in claim 1, wherein the DC bus voltage ranges from about 10% to about 20% more than a nominal voltage of DC bus if the HVRT mode is activated.

9. The wind turbine as recited in claim 1, wherein the threshold voltage ranges from about 130% to about 180% of a nominal voltage of the power grid.

10. A wind turbine connected to a power grid, the wind turbine selectively activated to operate at a high-voltage ride through (HVRT) mode, the wind turbine comprising:
    a grid voltage circuit for monitoring a fundamental voltage of the power grid and generating a mode signal in the event the fundamental voltage is at least about equal to a threshold voltage value, the mode signal activating the HVRT mode, the threshold voltage ranging from about 130% to about 180% of a nominal voltage of the power grid;
    a DC bus having a DC bus voltage;
    a voltage source providing a DC bus rated voltage;
    a dynamic brake having a brake chopper and a resistive element, the dynamic brake connected to the DC bus, and the dynamic brake connected to the voltage source if the HVRT mode is activated, the brake chopper regulating the DC bus voltage by connecting the resistive element to the DC bus if the DC bus voltage is at least about equal to the DC bus rated voltage; and
    a voltage switching element in communication with the grid voltage circuit and selectively connected to the voltage source, wherein the voltage switching element supplies the dynamic brake with the DC bus rated voltage in the event the mode signal is sent to the voltage switching element.

11. The wind turbine as recited in claim 10, comprising a normal operation voltage source that is configured for providing a nominal range voltage to the DC bus if the wind turbine is not in the HVRT mode, wherein the voltage switching element switches from the normal operation voltage source to the voltage source if the HVRT mode is activated.

12. The wind turbine as recited in claim 10, wherein the DC bus rated voltage is the greatest amount of voltage that the DC bus is configured to withstand for a specified period of time while substantially ensuring operation of the DC bus.

13. The wind turbine as recited in claim 12, wherein the specified period of time ranges from about 40 milliseconds to about 60 milliseconds.

14. The wind turbine as recited in claim 10, comprising a grid side converter and a generator side converter, wherein the DC bus couples the grid side converter with the generator side converter.

15. The wind turbine as recited in claim 14, comprising a mode switching element in communication with the grid voltage circuit and selectively connected to a six-step modulator, wherein the mode switching element connects the grid side converter to the six-step modulator if the HVRT mode is activated.

16. A method of controlling a wind turbine, the wind turbine selectively activated to operate at a high-voltage ride through (HVRT) mode, the method comprising:
    monitoring a fundamental voltage of a power grid by a grid voltage circuit;
    generating a mode signal in the event the fundamental voltage is at least about equal to a threshold voltage value;
    providing a DC bus having a DC bus voltage, a voltage source providing a DC bus rated voltage, and a dynamic brake having a brake chopper and a resistive element;
    connecting the dynamic brake to the DC bus;
    connecting the dynamic brake to the voltage source if the HVRT mode is activated; and
    regulating the DC bus voltage with the brake chopper connecting the resistive element to the DC bus if the DC bus voltage is at least about equal to the DC bus rated voltage;
    providing a grid side converter and a generator side converter, wherein the DC bus couples the grid side converter with the generator side converter;
    providing a mode switching element in communication with the grid voltage circuit and selectively connected to a six-step modulator, wherein the mode switching element connects the grid side converter to the six-step modulator if the HVRT mode is activated, the six-step modulator providing a switching frequency to the grid side converter that is about the same as a fundamental frequency of the power grid.

* * * * *